US008423752B2

(12) United States Patent
Symes et al.

(10) Patent No.: US 8,423,752 B2
(45) Date of Patent: Apr. 16, 2013

(54) APPARATUS AND METHOD FOR PERFORMING PERMUTATION OPERATIONS IN WHICH THE ORDERING OF ONE OF A FIRST GROUP AND A SECOND GROUP OF DATA ELEMENTS IS PRESERVED AND THE ORDERING OF THE OTHER GROUP OF DATA ELEMENTS IS CHANGED

(75) Inventors: Dominic Hugo Symes, Cambridge (GB); Mladen Wilder, Cambridge (GB)

(73) Assignee: ARM Limited, Cambridge (GB)

( * ) Notice: Subject to any disclaimer, the term of this patent is extended or adjusted under 35 U.S.C. 154(b) by 580 days.

(21) Appl. No.: 12/314,760

(22) Filed: Dec. 16, 2008

(65) Prior Publication Data
US 2009/0187746 A1 Jul. 23, 2009

(30) Foreign Application Priority Data
Jan. 22, 2008 (GB) .................................. 0801137.1

(51) Int. Cl.
*G06F 7/00* (2006.01)
*H03M 13/27* (2006.01)

(52) U.S. Cl.
USPC .......................................... 712/300; 714/790

(58) Field of Classification Search .................. None
See application file for complete search history.

(56) References Cited

U.S. PATENT DOCUMENTS

| 5,673,321 | A * | 9/1997 | Lee .................................. 380/37 |
| 6,718,492 | B1 | 4/2004 | Shavit et al. |
| 6,910,110 | B2 * | 6/2005 | Kim et al. ........................ 711/157 |
| 6,922,472 | B2 * | 7/2005 | Lee et al. .......................... 380/37 |
| 6,952,478 | B2 * | 10/2005 | Lee et al. .......................... 380/37 |
| 7,730,292 | B2 * | 6/2010 | Lee .................................. 712/300 |
| 2002/0031220 | A1 * | 3/2002 | Lee et al. .......................... 380/37 |
| 2002/0078011 | A1 * | 6/2002 | Lee et al. ............................ 707/1 |
| 2002/0108030 | A1 * | 8/2002 | Lee et al. ....................... 712/300 |
| 2002/0158780 | A1 * | 10/2002 | Kajita ............................. 341/50 |
| 2002/0194235 | A1 * | 12/2002 | Yamamoto et al. ........... 708/403 |

(Continued)

FOREIGN PATENT DOCUMENTS
GB 2 419 706 5/2006

OTHER PUBLICATIONS

Dimitrakopoulos et al. (Fast Bit Permutation Unit for Media Enhanced Microprocessors); This paper appears in: Circuits and Systems, 2006. ISCAS 2006. Proceedings. 2006 IEEE International Symposium on; On pp. 49-52.*

(Continued)

*Primary Examiner* — Keith Vicary
(74) *Attorney, Agent, or Firm* — Nixon & Vanderhye P.C.

(57) ABSTRACT

An apparatus for processing data is provided comprising processing circuitry having permutation circuitry for performing permutation operations, a register bank having a plurality of registers for storing data and control circuitry responsive to program instructions to control the processing circuitry to perform data processing operations. The control circuitry is arranged to be responsive to a control-generating instruction to generate in dependence upon a bit-mask control signals to configure permutation circuitry for performing permutation operation on an input operand. The bit-mask identifies within the input operand the first group of data elements having a first ordering and a second group of data elements having a second ordering and the permutation operation is such that it preserves one of the first ordering and the second ordering but changes the other of the first ordering and the second ordering.

22 Claims, 15 Drawing Sheets

U.S. PATENT DOCUMENTS

| | | | |
|---|---|---|---|
| 2003/0002474 A1* | 1/2003 | Alexander et al. | 370/351 |
| 2004/0054877 A1 | 3/2004 | Macy, Jr. et al. | |
| 2004/0078549 A1* | 4/2004 | Tanaka et al. | 712/22 |
| 2005/0071403 A1* | 3/2005 | Taunton | 708/404 |
| 2005/0114420 A1* | 5/2005 | Gibb et al. | 708/404 |
| 2006/0039555 A1* | 2/2006 | Lee et al. | 380/37 |
| 2006/0227966 A1* | 10/2006 | Knowles | 380/42 |
| 2007/0106881 A1* | 5/2007 | Thornton | 712/223 |
| 2007/0255849 A1* | 11/2007 | Zheng | 709/238 |
| 2008/0122854 A1* | 5/2008 | Mejdrich et al. | 345/522 |
| 2008/0301383 A1* | 12/2008 | Nieminen | 711/157 |
| 2009/0138534 A1* | 5/2009 | Lee et al. | 708/209 |
| 2009/0168801 A1* | 7/2009 | Zheng | 370/464 |

OTHER PUBLICATIONS

Lee et al. (Efficient Permutation Instructions for Fast Software Cryptography); This paper appears in: Micro, IEEE Issue Date: Nov./Dec. 2001; vol. 21 Issue:6; On pp. 56-69.*

Smith (An Overview of Virtual Machine Architectures); Excerpt from "Virtual Machines: Architectures, Implementations and Applications," published by Morgan Kaufmann Publishers, 2004; 21 pages.*

Dimitrakopoulos et al. (Sorter Based Permutation Units for Media-Enhanced Microprocessors); IEEE Transactions on Very Large Scale Integration (VLSI) Systems, vol. 15, No. 6, Jun. 2007; 5 pages.*

Hilewitz et al. (Advanced Bit Manipulation Instruction Set Architecture); Princeton University Department of Electrical Engineering Technical Report CE-L2006-004, Nov. 2006; 17 pages.*

McGregor et al. (Architectural Enhancements for Fast Subword Permutations with Repetitions in Cryptographic Applications); pp. 0453, 2001 IEEE International Conference on Computer Design (ICCD'01), 2001; 9 pages.*

Shi et al. (Bit Permutation Instructions for Accelerating Software Cryptography); This paper appears in: Application-Specific Systems, Architectures, and Processors, 2000. Proceedings. IEEE International Conference on; Issue Date: 2000; On pp. 138-148.*

Shi (Bit Permutation Instructions: Architecture, Implementation, and Cryptographic Properties); PHD dissertation for Princeton University—Dept. of Electrical Engineering, Jun. 2004; 243 pages.*

Shi et al. (Subword Sorting with Versatile Permutation Instructions); Proceedings of ICCD 2002 International Conference on Computer Design, pp. 234-341, Sep. 2002.*

Dimitrakopoulos et al. (An Energy-Delay Efficient Subword Permutation Unit); This paper appears in: Application-specific Systems, Architectures and Processors, 2006. ASAP '06. International Conference on; Issue Date: Sep. 2006; 6 pages.*

Hilewitz et al. (Fast Bit Compression and Expansion with Parallel Extract and Parallel Deposit Instructions); Proceedings of the IEEE 17th International Conference on Application-Specific Systems, Architectures and Processors (ASAP), pp. 65-72, Sep. 11-13, 2006.*

Batcher (Sorting networks and their applications); AFIPS '68 (Spring) Proceedings of the Apr. 30-May 2, 1968, spring joint computer conference; 8 pages.*

X. Yang et al, "Fast Subword Permutation Instructions Using Omega and Flip Network Stages" Computer Design, 2000, International Conference Proceedings, IEEE Sep. 2000, pp. 15-22.

International Search Report dated Feb. 24, 2009 for PCT/GB2008/003948.

United Kingdom Search Report for GB Application No. 0801137.1, dated Jun. 9, 2008.

Hilewitz, Yedidya et al., "Comparing Fast Implementations of Bit Permutation Instructions", Proceedings of the 38th Annual Asilomar Conference on Signals, Systems, and Computers, (Nov. 2004), 8 pages.

Yang, Xiao et al., "Fast Subword Permutation Instructions Based on Butterfly Networks", Proceedings of SPIE, Media Processor 2000, (Jan. 27-28, 2000), 7 pages.

Shi, Zhijie Jerry et al., "Implementation Complexity of Bit Permutation Instructions", 8 pages.

UK Examination Report dated Oct. 17, 2011 in GB 0801137.1.

* cited by examiner

INPUT  $2^{n+1}$ bit mask  $(m[2^{n+1}-1] --- m[v])$

Control value i, $0 \leq i \leq n$

OUTPUT  $2^n$ bit control value  $(c_i[2^n-1] --- c_i[0])$

\*\* Here n=LOG_ELEM16; and ELEMENTS16=2^n is the number of elements in a register. \*\*

```
vdtlc16_t vdtlc_b16(vbool16_t x0, vbool16_t x1)
{
  VNEW_b16(Ctrl);
  vdtlc16_t Dtlc;
  bool_t b0,b1,bOdd,bSwap;
  bool_t b[2*ELEMENTS16];
  int i,j,k,n;

for (i=0; i<ELEMENTS16; i++)
  {
    b[0*ELEMENTS16+i] = VGET_b16(x0,i);
    b[1*ELEMENTS16+i] = VGET_b16(x1,i);
  }
  for (k=0,n=LOG_ELEM16; k<=LOG_ELEM16; k++, n--)
  {
    for (i=0; i<(1<<k); i++)
    {
      bOdd = 0;
      for (j=0; j<(1<<n); j++)
      {
        b0 = b[((2*j+0)<<k)+i];
        b1 = b[((2*j+1)<<k)+i];
        bSwap = bOdd ^ b0;
        if (bSwap)
        {
          b[((2*j+0)<<k)+i] = b1;
          b[((2*j+1)<<k)+i] = b0;
        }
        bOdd = bSwap^b1;
        VSET_b16(Ctrl,(i<<n)+j,bSwap);
      }
    }
    VSET_c16(Dtlc,k,Ctrl);
  }
  return Dtlc;
}
```

FIG. 7

```
vint16x2_t vdtl_s16(vdtlc16_t x0,  vint16_t x1, vint16_t x2
{
        vint16x2_t uz;
        int i;

for (i=0; i<=LOG_ELEM16; i++)
        {
                uz = vuzp_s16(x1, x2);
                x1 = vbsl_s16(VGET_c16(x0, i), uz.a1, uz.a0);
                x2 = vbsl_s16(VGET_c16(x0, i), uz.a0, uz.a1);

}
        uz.a0=x1;
        uz.a1=x2;
        return uz;
}
```

FIG. 8

```
vint16x2_t vitl_s16(vdtlc16_t x0,  vint16_t x1, vint16_t x2, uint_t x3)
{
        vint16x2_t z;
        int i;

z = vrot_s16(x1, x2, x3);
        for (i=LOG_ELEM16;  i>=0;  i--)
        {
                x1 = vbsl_s16(VGET_c16(x0, i),  z.a1,  z.a0);
                x2 = vbsl_s16(VGET_c16(x0, i),  z.a0,  z.a1);
                z  = vzip_s16(x1, x2);
        }
        return z;
}
```

FIG. 9

APPARATUS AND METHOD FOR PERFORMING PERMUTATION OPERATIONS IN WHICH THE ORDERING OF ONE OF A FIRST GROUP AND A SECOND GROUP OF DATA ELEMENTS IS PRESERVED AND THE ORDERING OF THE OTHER GROUP OF DATA ELEMENTS IS CHANGED

BACKGROUND OF THE INVENTION

This application claims priority to GB Application No. 0801137.1 filed Jan. 22, 2008, the entire contents of which is incorporated herein by reference.

1. Field of the Invention

The present invention relates to an apparatus and method for performing permutation operations on data.

Data processing applications such as signal processing applications typically require data rearrangement to be performed at high data rates. When data processing is sufficiently accelerated, for example, when using a single instruction multiple data (SIMD) engine, then data rearrangements such as permutation can become a bottle-neck in performing the computations.

In signal processing applications such as those used in radio standards very common forms of permutations are de-interleave operations and interleave operations. These operations are performed in order to separate two or more channels in the case of the de-interleaving or to combine two or more channels in the case of interleaving. One example is the separation of data channels from pilot channels (i.e. control channels). Error correction is commonly used in signal processing to correct errors that can arise due to transmission of data across a noisy communication channel. During error correction processing puncturing and de-puncturing of data is often performed. Puncturing is used to vary the tradeoff between data rate and error robustness. The puncturing operation involves de-interleaving data channels and throwing away the second channel whereas de-puncturing involves interleaving one communication channel with zeros.

2. Description of the Prior Art

It is known to perform de-interleaving operations using a plurality of butterfly permutation networks in parallel. For example, the publication "*Comparing Fast Implementations of Bit Permutation Instructions*", by Y. Hilewitz, Z. Shee and R Lee, Proceedings of 38th Annual Asilomar Conference on Signals, Systems and Computers, November 2004 describes how a GRP instruction, which performs a de-interleave operation, is implemented on two butterfly networks in parallel. This publication states that GRP cannot be performed on a butterfly or inverse butterfly network, but that two inverse butterfly networks may be used to group the R bits and L bits in parallel. One butterfly network de-interleaves a first channel and the other butterfly network de-interleaves a second channel. However, this technique cannot be used to perform interleave operations, only de-interleave operations. It is also known to perform generic permutation instructions using cross-bar arrangements. However, such cross-bar networks involve the order of $n^2$ computations for an n-input cross-bar. Accordingly, such cross-bar networks are not very area-efficient.

Thus there is a requirement to provide accelerated data permutation operations in a more efficient way. There is also a requirement to be able to perform interleave operations using a butterfly permutation network.

SUMMARY OF THE INVENTION

According to a first aspect the present invention provides apparatus for processing data, said apparatus comprising:

processing circuitry for performing data processing operations comprising permutation circuitry for performing permutation operations;

a register bank having a plurality of registers for storing data;

control circuitry responsive to program instructions to control said processing circuitry to perform said data processing operations;

wherein said control circuitry is arranged to be responsive to a control-generating instruction to generate in dependence upon a bit-mask, control signals to configure said permutation circuitry for performing a permutation operation on an input operand comprising data stored in one or more registers of said register bank;

wherein said bit-mask identifies within said input operand a first group of data elements having a first ordering and a second group of data elements having a second ordering and wherein said permutation operation preserves one but changes the other of said first ordering and said second ordering.

The present invention recognises that by performing a permutation operation on an input operand comprising a first group of data elements having a first ordering and a second group of data elements having a second ordering and preserving one of the first and second ordering but changing the other of the first and second ordering, a more efficient permutation operation can be performed using control circuitry in dependence upon a bit-mask and generating control signals to configure permutation circuitry for performing the permutation operation. Providing a control-generating instruction that enables such a permutation operation to be performed provides a great deal of flexibility in configuring the permutation circuitry and enables permutation operations to be performed in a more area-efficient manner. It also ameliorates the problem of data rearrangement becoming a bottle neck with the data rearrangement is performed as high data rates.

It will be appreciated that the changed ordering of one of the first ordering and the second ordering of the input operand as a result of the permutation operation could comprise any one of a number of different changes of ordering relative to the input ordering. However, in one arrangement, the changed ordering of one of the first ordering and the second ordering comprises a reversed ordering. The reversed ordering of one of the two ordered data sets enables the data of the two data sets to be readily separated and easily re-ordered according to the input ordering. Furthermore, the reversed ordering of the second data set simplifies the permutation circuitry.

It will be appreciated that the permutation operation could be any one of a number of different permutation operations such as a simple reordering or a data reversal. However, in one embodiment, the permutation operation is one of an interleave operation and a de-interleave operation. These operations are commonly performed in signal processing applications and their efficient implementation using the permutation circuitry and control circuitry according to the present technique is likely to improve overall processing throughput.

It will be appreciated that the control generating instruction could serve only to configure the permutation circuitry for performing the permutation operation. A separate instruction could be provided to actually control the permutation circuitry to perform the permutation operation. However, in one embodiment, the control circuitry is responsive to the control generating instruction both to configure the permutation circuitry and to perform the permutation operation. This provides a convenient implementation of the permutation operation. Use of a single instruction simplifies execution of a commonly occurring operation allowing a program code to be more compact.

It will be appreciated that the data elements of the input operand could be single-bit data elements, but in one embodiment, the data elements of the input operand comprise multi-bit data elements. Permuting multi-bit data elements rather than single-bit data elements requires fewer memory accesses and thus is more efficient.

It will be appreciated that the input operand or the permutation operation could comprise any type of input operand such as a scalar or a standard vector. However, in one embodiment, the input operand comprises a packed vector comprising data, for example, from more than one communication channel. The use of packed vectors parallelises the calculation and thus accelerates processing.

It will be appreciated that the input operand to the permutation operation could comprise a scalar. Similarly, the output generated by the permutation operation could comprise a scalar value. However, in one embodiment the permutation operation is performed on input vector data comprising the two ordered data sets and generates an output vector comprising one of said first and second groups of data elements having preserved ordering and the other of said first and second groups of data elements having changed ordering. Vector processing reduces the number of memory accesses required to perform a given calculation and thus improves the efficiency of the calculation.

It will be appreciated that the input vector could be populated directly from memory. However, in one embodiment, the input vector comprises a plurality of vector registers and the output vector comprises a respective plurality of vector registers. The use of registers in this way makes the data more readily accessible thus increasing the throughput of the calculation.

It will be appreciated that the bit-mask could be stored anywhere by the data processing apparatus, for example in main memory. However, in one embodiment, the data processing apparatus comprises at least one mask register for storing the bit-mask. A special-purpose mask register makes the permutation operation simpler to implement.

It will be appreciated that the at least one mask register could be configured in any one of a number of different ways to distinguish between the first group of data elements and the second group of data elements. However, in one embodiment, the at least one mask register uses a zero bit to indicate one of the first group of data elements and the second group of data elements and a one bit to indicate the other of the two groups of data elements. In an alternative embodiment the at least one mask register is a Boolean register. These types of mask registers are straightforward to implement and thus simplify fabrication of the data processing apparatus.

It will be appreciated that the permutation circuitry could take any one of a number of different forms provided that it is capable of performing the permutation operations. However, in one embodiment, the permutation circuitry comprises a butterfly network arranged to rearrange a plurality of data elements in dependence upon butterfly connections between pairs of the data elements. Implementation of the permutation circuitry as a butterfly network is particularly efficient since it enables an n-input computation to be performed in log n stages. This compares favourable with, for example, crossbar networks which require $n^2$ stages for an n-input computation. Butterfly networks are simple to configure and efficient to implement. Implementation of the permutation circuitry as a butterfly network allows a single butterfly network to be implemented in order to perform both an interleave operation and a de-interleave operation. This compares favourably with previously known systems in which only a de-interleave operation (not an interleave) could be performed using butterfly networks and at least two separate networks were required to perform the de-interleaving operation. The ability to use a single butterfly network enables the computation to be performed using half the power of two butterfly networks.

It will be appreciated that the butterfly network could be an in-place butterfly network, in which the data elements stay fixed and the butterflies change. However, in one embodiment, the butterfly network is a constant geometry network in which the butterfly connections remain fixed whilst the plurality of data elements are permitted to move.

It will be appreciated that the first and second groups of data elements could each have an identical number of constituent data elements. However, in one embodiment, the first group of data elements and second group of data elements have different numbers of constituent data elements. This provides a great deal of flexibility in implementing the permutation calculation and allows a wider variety of interleave and de-interleave operations to be performed.

It will be appreciated that the first group of data elements and the second group of data elements could comprise data from a single source. However, in one embodiment, the first group of data elements and the second group of data elements correspond respectively to two different communication channels. This allows efficient handling of commonly occurring signal processing operations by facilitating interleaving and de-interleaving of two different communication channels.

It will be appreciated that the data processing apparatus could take any one of a number of different forms, for example the data processing apparatus could be a central processing unit (CPU). However, in one embodiment, the data processing apparatus is a digital signal processor. In an alternative embodiment the data processing apparatus is a co-processor.

According to a second aspect the present invention provides a method of performing permutation operations using a data processing apparatus having processing circuitry for performing data processing operations, a register bank having a plurality of registers for storing data and control circuitry responsive to program instructions to control said processing circuitry to perform said data processing operations, said processing circuitry comprising permutation circuitry for performing permutation operations, said method comprising the step of:

(i) in response to a control-generating instruction, generating in dependence upon a bit-mask, control signals to configure said permutation circuitry for performing a permutation operation on an input operand comprising data stored in one or more registers of said register bank;

wherein said bit-mask identifies within said input operand a first group of data elements having a first ordering and a second group of data elements having a second ordering and wherein said permutation operation preserves one but changes the other of said first ordering and said second ordering.

According to a third aspect, the present invention provides a virtual machine providing an emulation of an apparatus for processing data, said apparatus comprising:

processing circuitry for performing data processing operations comprising permutation circuitry for performing permutation operations;

a register bank having a plurality of registers for storing data;

control circuitry responsive to program instructions to control said processing circuitry to perform said data processing operations;

wherein said control circuitry is arranged to be responsive to a control-generating instruction to generate in dependence upon a bit-mask, control signals to configure said permutation circuitry for performing a permutation operation on an input operand comprising data stored in one or more registers of said register bank;

wherein said bit-mask identifies within said input operand a first group of data elements having a first ordering and a second group of data elements having a second ordering and wherein said permutation operation preserves one but changes the other of said first ordering and said second ordering.

Various other respective aspects and features of the invention are defined in the appended claims. Combinations of features from the dependent claims may be combined with features of the independent claims as appropriate and not merely as explicitly set out in the claims.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 provides a program-code listing in the C programming language for a control generating instruction VDTLC according to an embodiment of the present invention;

FIG. 8 is a program-code listing of an example deinterleave instruction;

FIG. 9 comprises program code associated with an interleave rearrangement instruction;

DESCRIPTION OF THE PREFERRED EMBODIMENTS

Figure 1:
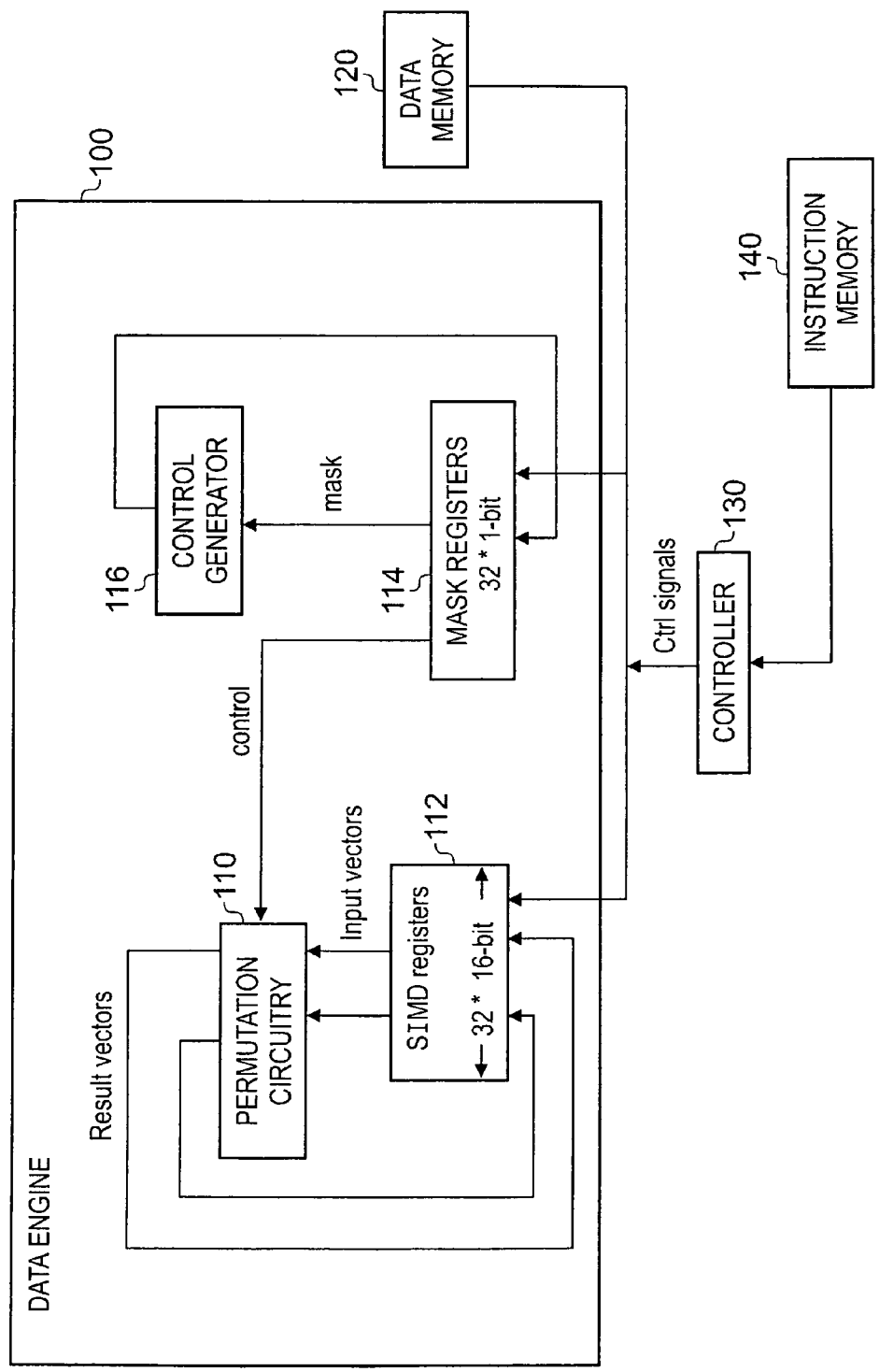
FIG. 1 schematically illustrates data processing apparatus according to an embodiment of the present invention.

FIG. 1 schematically illustrates a data processing apparatus according to an embodiment of the present invention. The apparatus comprises a data engine 100 having: a butterfly permutation network 110; SIMD registers 112; a mask register bank 114; and a control generator 116. The data processing apparatus further comprises, externally to the data engine, a data memory 120, a controller 130 and an instruction memory 140.

The butterfly permutation network 110 performs permutation operations on input samples comprising packed vectors having a plurality of multi-bit data elements read from the SIMD registers 112. The SIMD registers are each 32 times 16-bit elements wide. Input vectors for the permutation operations are performed using pairs of registers i.e. 64*16-bit elements at a time. The results of the permutations are written back into the SIMD register bank 112. The processing circuitry of the data engine 100 performs data processing operations in response to execution of program instructions read from the instruction memory 140. The controller 130 converts those instructions into control signals which control the processing circuitry of the data engine 100 to perform the data processing operations. However, the butterfly permutation network 110 is further controlled by control signals generated by the control generator circuitry 116 within the data engine 100.

In particular, the control generator 116 generates control signals for configuring the butterfly permutation network 110 in dependence upon an input bit-mask which is read from the 32-bit mask register bank 114. The control generator circuitry 116 outputs the generated control signals and stores them in the mask register bank 114. The control signals are in turn read from the mask register bank 114 and are supplied to the butterfly network at the appropriate time to perform the relevant permutation operation.

The result vectors of the permutation operations are "packed" vectors comprising 64*16-bit data elements. The bit-masks applied to the control generator circuitry 116 by the mask register bank 114 serve to identify in the input vector a first group of data elements having a first ordering and a second group of data elements having a second ordering. For example, the first group of data elements may correspond to data of a first communication channel whilst the second group of data elements corresponds to a second communication channel. Since the permutation operations are performed using pairs of 32*16-bit registers, the control generator 116 reads two 32-bit mask registers to obtain the 64 mask bits required to identify the two data sets within the 64 elements permuted. The control signals generated by the control generator 116 configure the butterfly network such that the permutation operation performed on the input vectors preserves one but changes the other of the first ordering and the second ordering. The data values in the SIMD registers and in the mask register may be read-in from the external data memory 120. The particular control signals output by the control generator circuitry 116 will vary in accordance with which of a plurality of possible mask vectors is supplied to the control generator circuitry 116 as input. Permutation network 110 operates on packed vectors comprising a total of 32 16-bit data elements.

Figure 2A:
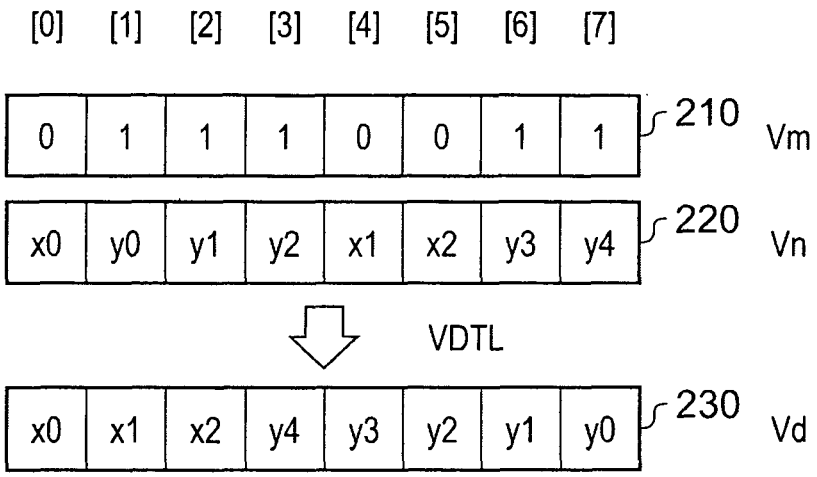
FIGS. 2A and 2B schematically illustrate a vector de-interleave instruction and a vector interleave instruction according to the present technique.
Figure 2B:
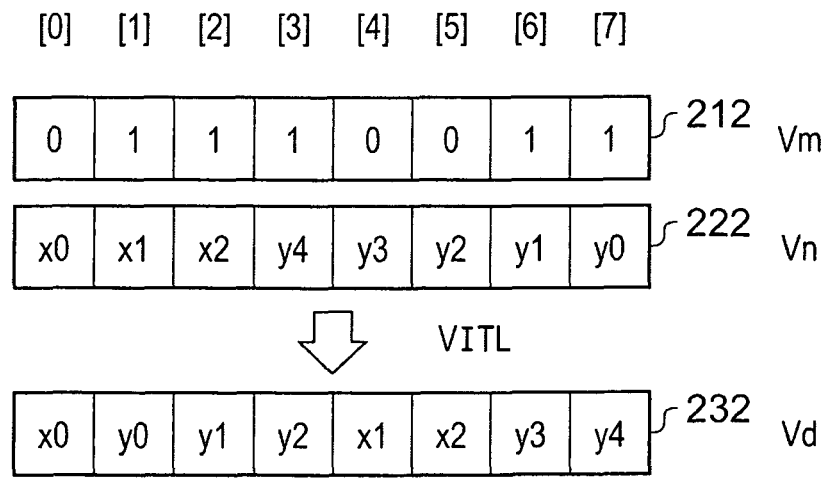

FIGS. 2A and 2B schematically illustrate a vector de-interleave instruction and a vector interleave instruction according to the present technique.

FIG. 2A schematically illustrates a vector de-interleave instruction that rearranges an input vector Vn comprising a plurality of data elements into an output vector Vd comprising channel 0 samples and reversed channel 1 samples according to a bit-mask Vm. The channel 0 samples are represented by x0, x1, x2 whilst the channel 1 samples are represented by y0, y1, y2, y3 and y4. In this particular example, the vectors comprise eight data elements each of which is a multi-bit data element. However, the bit-mask Vm comprises a total of eight bits corresponding to the eight data elements of the vector. The vector de-interleave instruction VDTL operates on an eight data-element input vector 220, which is read from the SIMD register bank 112 of FIG. 1 and the butterfly permutation network 110 of FIG. 1 is configured in dependence upon the bit-mask 210 so that, as a result of the permutation, the channel 0 samples are separated from the channel 1 samples. Thus the output vector 230 is a packed vector in which the channel 0 samples, x0, x1 and x2 are output in order whereas the channel 1 samples y4, y3, y2, y1 and y0 are output in reverse order. It can be seen that the bit-mask 210 has bit-values of 0 corresponding to the channel 0 samples and has bit-values of 1 corresponding to the channel 1 samples. Thus the bit-mask 210 enables the butterfly permutation circuitry 110 to distinguish between the channel 0 samples and the channel 1 samples in order to perform the separation of the two channels.

FIG. 2B schematically illustrates a vector interleave instruction VITL according to an embodiment of the present invention. The vector interleave instruction operates on an eight data-element input vector 222 comprising both channel 0 and channel 1 samples. In this case, the channel 0 samples are arranged contiguously in the input vector Vn, as are the channel 1 samples. The bit-mask 212 specifies how the interleave operation should be performed. In particular, the position in the output vector Vd corresponding to where channel 0 samples should be placed has a 0 in the corresponding bit-mask position whereas positions in the output vector where channel 1 samples should be placed have values of 1 in the corresponding bit-mask position. Thus the output vector 232 has channel 0 data elements x0, x1 and x2 interleaved with channel 1 data elements y0, y1, y2, y3 and y4. In this case of output vector 232 of FIG. 2B, reading the vector from left to right the channel 0 samples are arranged in ascending order as are the channel 1 samples. This can be contrasted with the output vector 230 of the vector de-interleave operation, where reading from left to right in the output vector 230, the channel 0 samples are arranged in ascending order whereas the channel 1 samples are arranged in descending order. Nevertheless, both in FIG. 2A and FIG. 2B, the ordering of the channel 0 data elements is preserved between the input vector Vn and the output vector Vd whereas the ordering of the channel 1 samples is reversed between the input vector Vn and the output vector Vd. Although the ordering of the channel 1 samples is reversed on output relative to the input ordering, it is generally straightforward to reverse the channel 1 sample ordering to obtain the input ordering a whole vector (or register) at a time following separation of the two channels. In this particular example embodiment, the bit-mask register is a register of Boolean values i.e. predicates. However, in alternative embodiments, the bit-mask register could be a normal register. In the arrangement of FIG. 1 the mask register bank 114 is a special predicate register bank whose registers contain a single bit per lane.

Figure 3:
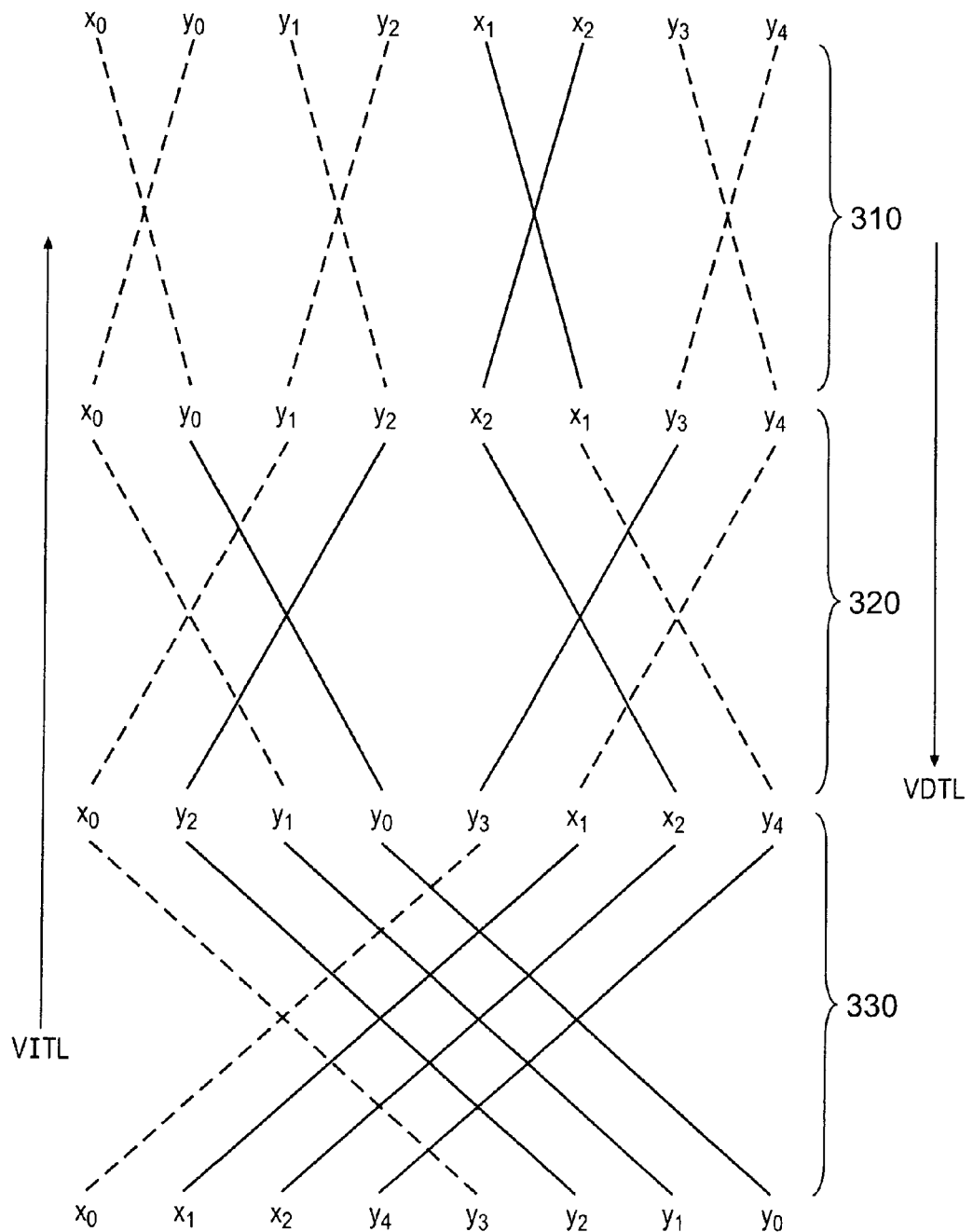
FIG. 3 schematically illustrates a series of permutations performed by the butterfly permutation network of FIG. 1 in implementing the vector interleave instruction VITL and the vector de-interleave instruction VDTL of FIGS. 2A and 2B.

FIG. 3 schematically illustrates a series of permutations performed by the butterfly permutation network 110 of FIG. 1 when implementing the vector interleave instruction (VITL) and the vector de-interleave instruction (VDTL) of FIGS. 2A and 2B. Butterfly networks have some attractive properties that make them suitable for use in performing data permutations. In this case the butterfly network has eight input data elements and the permutation can be broken into three individual stages: a first stage 310; a second stage 320; and a third and final stage 330. In general, the total number of stages in an n-input butterfly network is log n and the total number of cross points is n log n. This is significantly fewer than the $n^2$ cross points that would occur in an n-input crossbar network. Thus the circuit implementation of the butterfly network is more area-efficient than a standard cross-bar. In the particular example of FIG. 3, there are a total of 24 cross points. In each stage of the butterfly network, for every input, there is another input that shares the same two possible outputs with it. These pairs of inputs will be denoted herein as shared inputs and their corresponding pairs of outputs are shared outputs. These shared pairs in the butterfly network are configured using a single bit. For example, in the first stage of the butterfly network the data element input pair x0, y0 are shared inputs having shared outputs directly below them as indicated by the dashed cross in the first stage. In this case, the data input elements x0 and y0 remain in their existing positions at the end of the first stage (i.e. they follow vertical paths rather than the dashed crossed paths). However, had the butterfly network been configured differently, these two input data elements could have swapped places.

In the second stage 320 of the butterfly network, the input data element y0 swaps positions with the input data element y2 at the output of the second stage and elements x2 and y3 also swap positions. Note that in this case the first stage 310 involves potential shifts of one position horizontally between input and output whereas the second stage involves swaps of two positions horizontally and the third stage involves swaps of four positions horizontally. In each case an input data element may remain in the same position on output as it did at the relevant input stage. It can been seen starting from the input stage 310, the eight data-element input vector $[x_0, y_0, y_1, y_2, x_1, x_2, y_3, y_4]$ corresponds to the input vector 220 in FIG. 2A and the three stages of permutation involved in implementing the de-interleave instruction can be traced by following from top to bottom in the butterfly permutation network of FIG. 3 such that the output of the third stage 330 corresponds to the output vector 230 of FIG. 2A. Conversely, starting from the bottom of the butterfly network of FIG. 3 and moving from stage 330 back through stage 320 and finally to stage 310 corresponds to implementing the vector interleave instruction VITL of FIG. 2B.

The control bits corresponding to the vector interleave instructions of FIGS. 2A and 2B can be derived from the butterfly diagram of FIG. 3 by noting that all data swaps at each stage have been indicated by solid lines whereas where no swap actually occurs dashed lines have been drawn. Thus, reading the control bits from right to left, the control bits for stage 310 would be [0, 1, 0, 0], the control bits for stage 320 would be [0, 1, 1, 0], whilst the control bits for stage 330 would be [1,1,1,0]. Note that both the vector interleave and the vector de-interleave instructions have been implemented using a single butterfly permutation network. In previously known systems it is not known at all to perform an interleave operation using a butterfly network and furthermore to perform a de-interleave operation using a butterfly network could only be implemented using at least two different butterfly networks back to back or side by side as in FIG. 4.

Figure 4:
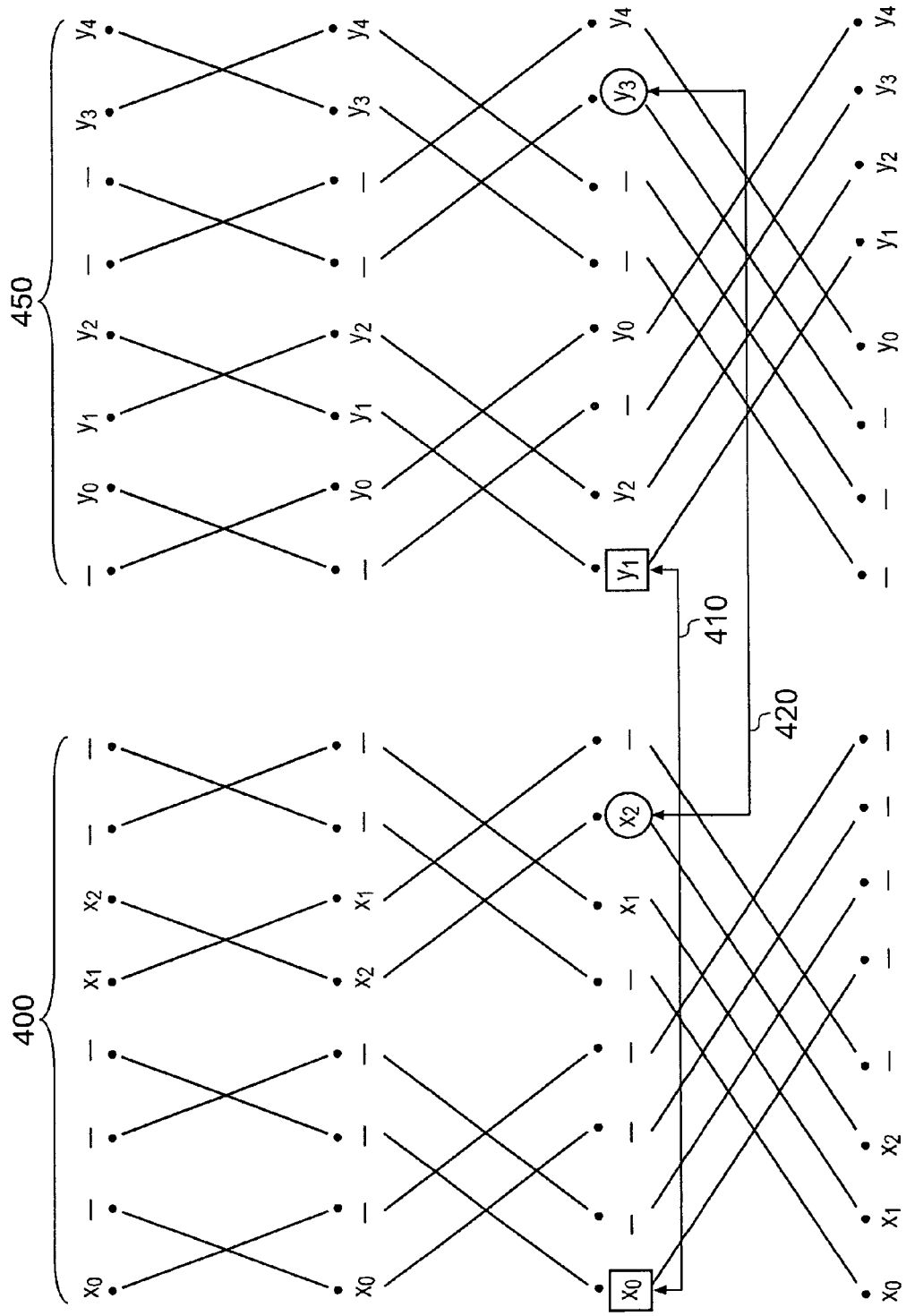
FIG. 4 schematically illustrates why two separate butterfly networks were required to implement a de-interleave operation in previously known systems.

FIG. 4 schematically illustrates why, in previously known systems, two separate butterfly networks were thought to be required to implement a de-interleave operation. FIG. 4 shows a first butterfly network 400 for the channel 0 samples and a second butterfly network 450 for the channel 1 samples. For consistency with the embodiment of the invention illustrated in FIG. 2A, the same eight-element interleaved input vector is used. However, only the channel 0 samples are in the first butterfly network 400, whilst the channel 1 samples are shown in the second butterfly network 450. In previously known systems, the output of the channel 0 samples and the channel 1 samples was such that the ordering of both channel sample data was preserved on output. In particular, the input ordering is x0, x1, x2 and y0, y1, y2, y3, y4 respectively and the output ordering is identical. Data elements corresponding to a given channel are contiguously arranged on output but not on input.

Note that in FIG. 3 a dashed line in the butterfly diagram indicated ano swap being performed whereas a solid line indicated a swap being performed. However in the diagrams of FIGS. 4, 10A and 01B all lines are solid lines. In these diagrams each solid cross denotes that elements may be swapped (according to the cross) or remain in the same position depending on an input control bit.

The butterfly diagram of FIG. 4 shows the three stages of rearrangement required in each case to generate the output vector. The fact that a single butterfly permutation network cannot be used to perform this de-interleave operation is clear from the output of stage 2 of each of the butterfly networks, where it is shown that there are two clashes 410, 420 in the required output positions of data elements. In particular, the clash 410 involves the element x0 having the left-most position in the first butterfly network, which is also required by data element $y_1$ in the second butterfly network 450. Similarly the second data element from the right in butterfly network 400 i.e. data element $X_2$ clashes at the output of the second stage with the channel 1 data element $Y_3$, which is required to be in the same output position as x2 to achieve the desired final ordering of the output vector. It can be seen by comparison of FIG. 3 and FIG. 4 that implementing the permutation according to the present technique results in improved efficiency. By allowing the channel 1 data to have reversed ordering on output, the calculation can be implemented using a single butterfly network. Furthermore, an interleave as well as a de-interleave operation can be readily and efficiently performed.

Figure 5A:
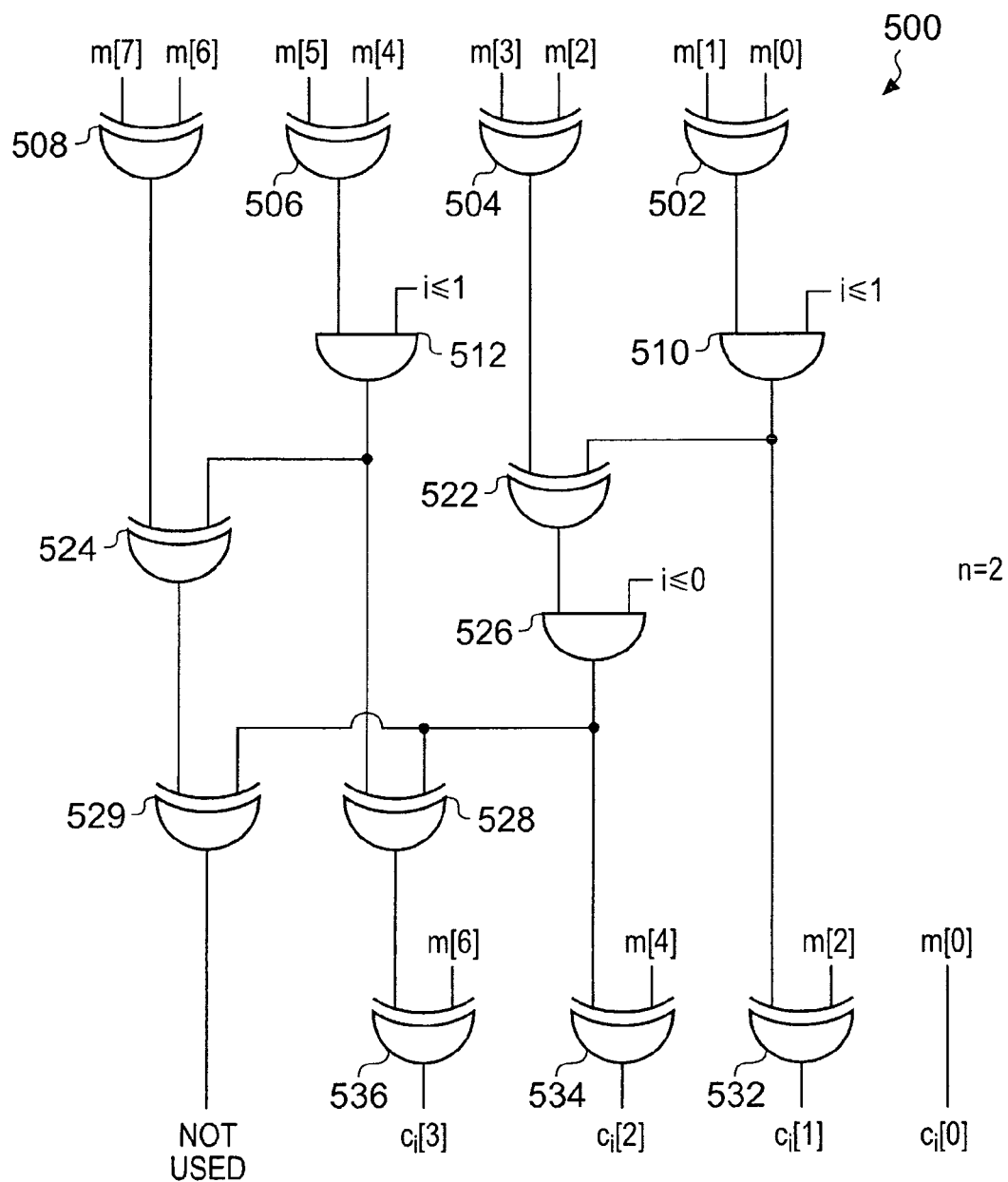
FIG. 5A schematically illustrates a particular embodiment of the control circuitry of the control generator 116 in the example of an eight-element bit-mask.

FIG. 5A schematically illustrates a particular embodiment of the control circuitry of the control generator 116 of FIG. 1 for the case of an eight-element bit-mask. The output of the control circuitry 500 represents the control bits $c_i[0]$, $c_i[1]$, $c_i[2]$, and $c_i[3]$. These four control bits correspond to the configuration bits for stage "i" of the butterfly permutation network of FIG. 3. The control bits are generated in dependence upon an 8-bit mask. The circuitry comprises a set of four exclusive OR (XOR) gates 502, 504, 506, 508. Mask-bits m[0] and m[1] are input to the first XOR gate 502, mask-bits m[2] and m[3] are input to the XOR gate 504, mask bits m[4] and m[5] are input to the XOR gate 506 and mask bits m[6] and m[7] are input to the XOR gate 508.

The output of the XOR gate 502 is supplied to an AND gate 510 together with an input that depends upon whether control value i is less then or equal to 1. The output of the AND gate 510 is supplied to a second XOR gate 522 and a third XOR gate 532. The output of the XOR gate 532 represents control bits $c_i[1]$. The control bit $c_i[0]$ corresponds directly to mask bit m[0]. A second input of the XOR gate 522 corresponds to the output of XOR gate 504. The output of the XOR gate 522 is supplied to an AND gate 526 together with an input that depends on whether the control bit i is less than or equal to 0. The output of the AND gate 526 is supplied as input to an XOR gate 534 together with the mask bit m[4]. The output of the XOR gate 534 corresponds to control bit $c_i[2]$.

The output of the AND gate 526 is also supplied as input to a further XOR gate 529, the output of which is not used. The output of AND gate 526 is further supplied to an XOR gate 528, whose output is in turn supplied to a further XOR gate 536 together with the mask bit m[6]. The output of this XOR gate 536 corresponds to the control bit $c_i[3]$. The output of the XOR gate 506 is supplied to the AND gate 512 together with an input that depends on whether the control bit i is less than or equal to 1. The output of this AND gate 512 is applied both as an input to the XOR gate 528 and as an input to the XOR gate 524.

Thus the control circuitry 500 comprises a plurality of XOR gates and a plurality of AND gates such that the output control bits depend both on the mask bits and on the control value i. Particular examples of values at each stage of the circuit of FIG. 5A will now be provided in the examples of FIGS. 5B, 5C and 5D.

EXAMPLE input $2^{n+1}$ bit-mask where n=2 and initial input mask m=[1 1 0 0 1 1 1 0]
i=0 $c_0[\ ]$=[0 1 0 0]
input mask for next stage m [ ]=[1 0 1 1 1 0 1 0]
i=1 $c_1[\ ]$=[0 1 1 0]
input mask for next stage m [ ]=[1 1 0 1 0 1 1 0]
i=2 $c_2[\ ]$=[1 1 1 0]
input mask for next stage m [ ]=[1 0 0 1 1 1 1 0]

Figure 5B:
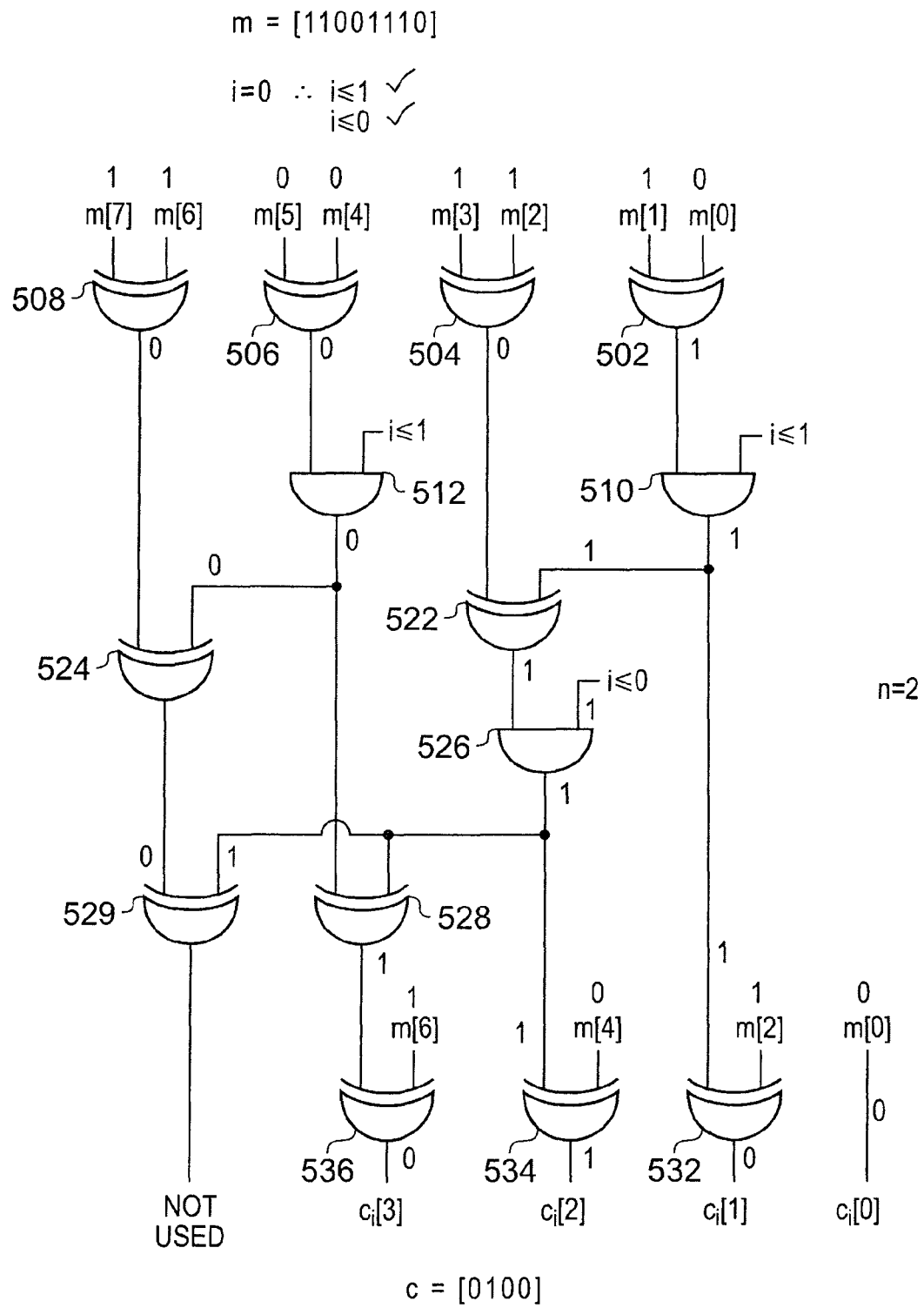
FIG. 5B represents the case where the control value i equals 0 and the input mask m equals [11001110]

FIG. 5B represents the case where the control bit i=0 and the input bit-mask m equals [11001110]. The logical outputs of each of the logic gates is indicated in the diagram on FIG. 5B. In this case, since i=0, and satisfies i≦1), the control-dependent inputs to the AND gates 510, 512 and 526 all take values of 1 rather than values of 0. It can be seen that the control-bit output generated by the above input mask corresponds to the 4-bit control value $c_0[\ ]$=[0, 1, 0, 0].

Figure 5C:
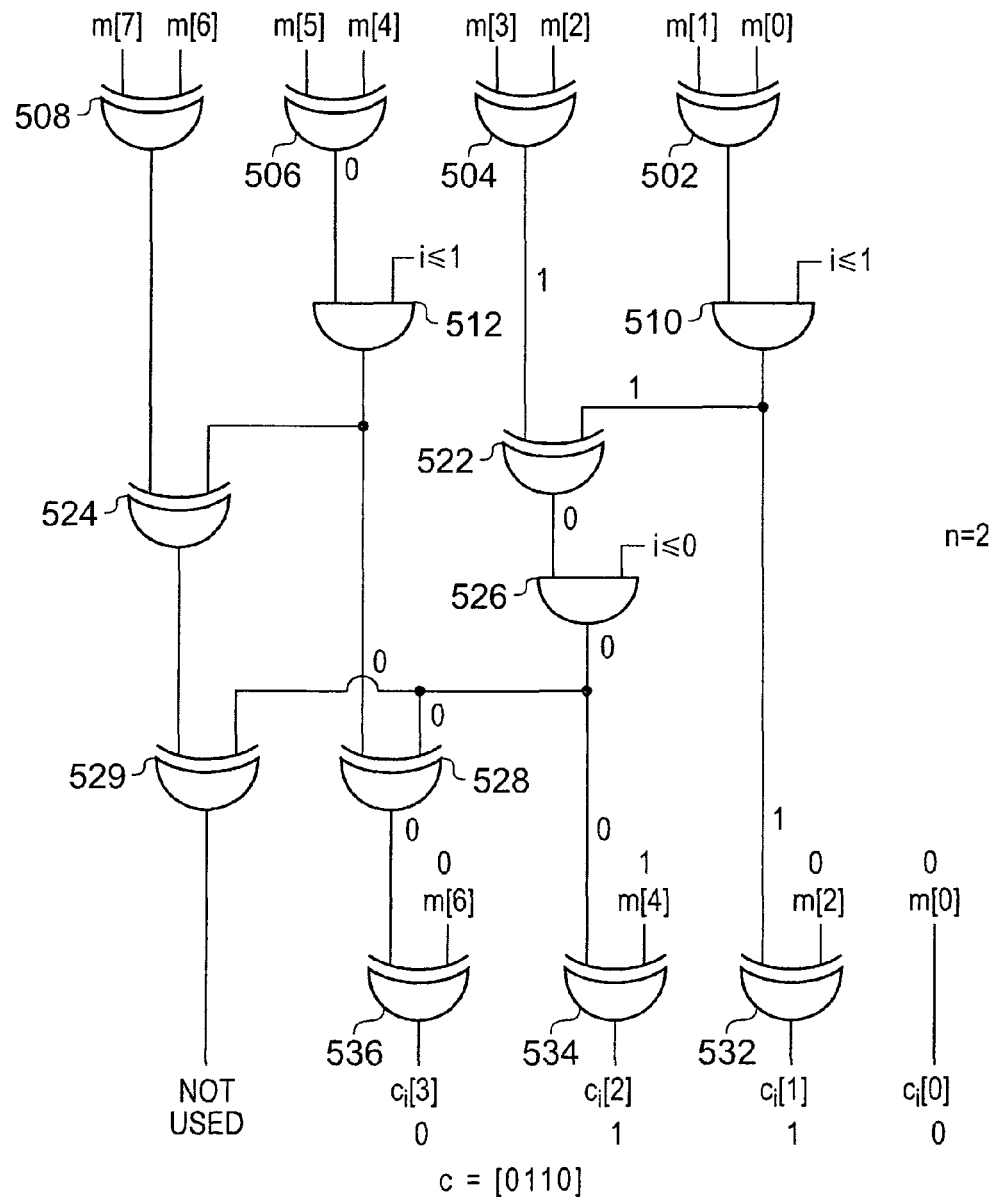
FIG. 5C shows the values for the input mask and the output control bits for control stage i equals 1 in the above calculation.

FIG. 5C shows the values for the input mask and the output control bits for i=1 in the calculation above. In this case, the input mask corresponds to m equals [10111010] i.e the input bit mask listed against stage i equals 0 above. The control bits generated at stage i=1 are $c_1[\ ]$=[0, 1, 1, 0] as shown. In this case, since i=1 (so condition is i≦1 is satisfied), the control-dependent input to the AND gates 510 and 512 are one rather than 0, but the control-dependent input to the AND gate 526 is 0.

Figure 5D:
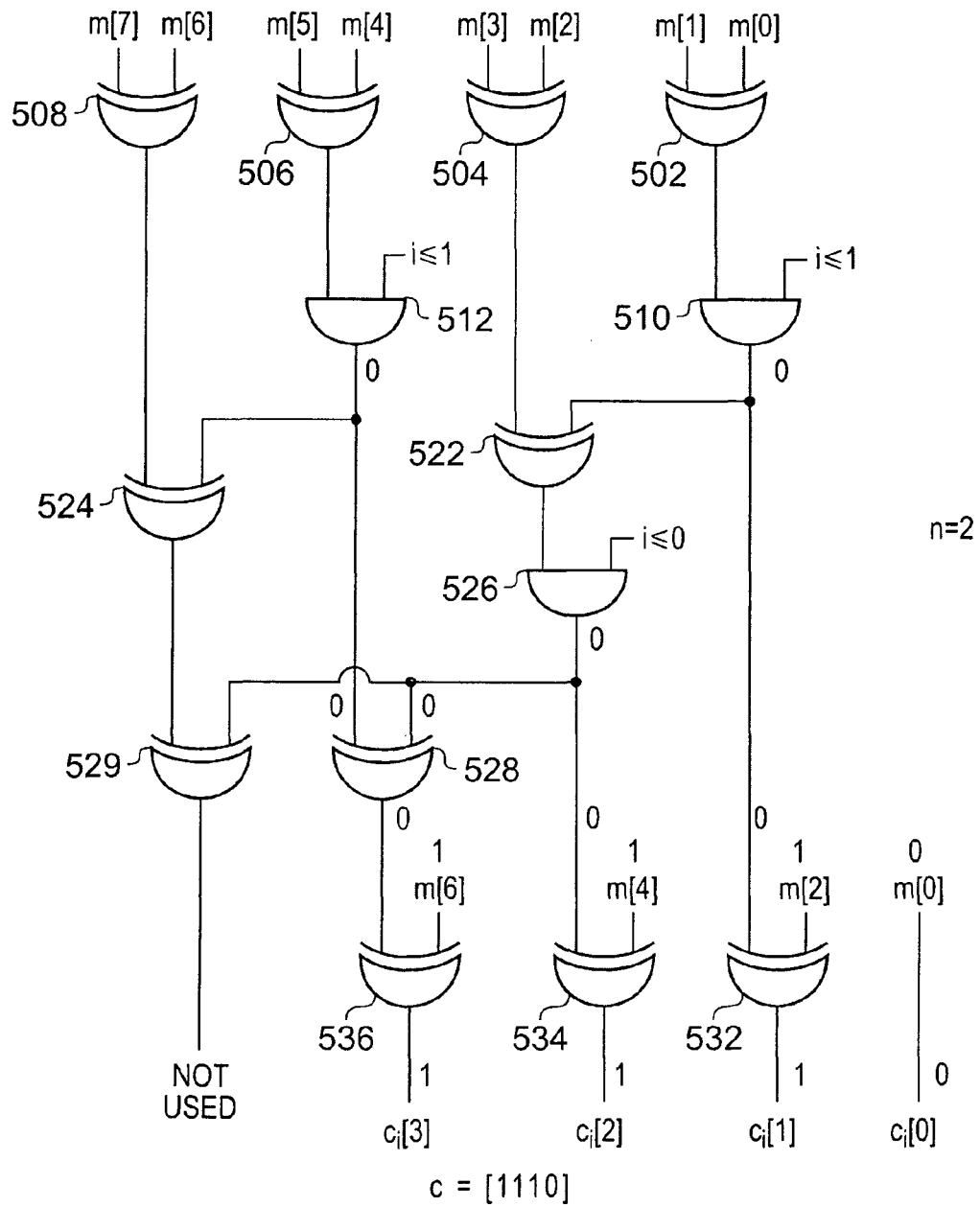
FIG. 5D shows the i equals 2 stage calculation with the corresponding inputs and outputs to each of the logic gates.

FIG. 5D shows the i=2 stage calculation, with the corresponding inputs and outputs to each of the logic gates. In this case, the input bit-mask m[ ]=[11010110], which is the bit-mask listed against i=1 above. The output generated at this stage=2 are the control bits $c_2[\ ]$=[1, 1, 1, 0]. In this case since i equals 2 the control-dependent inputs to each of the AND gates 510, 512 and 526 are 0 (because condition i≦1 is not satisfied).

Figure 6:
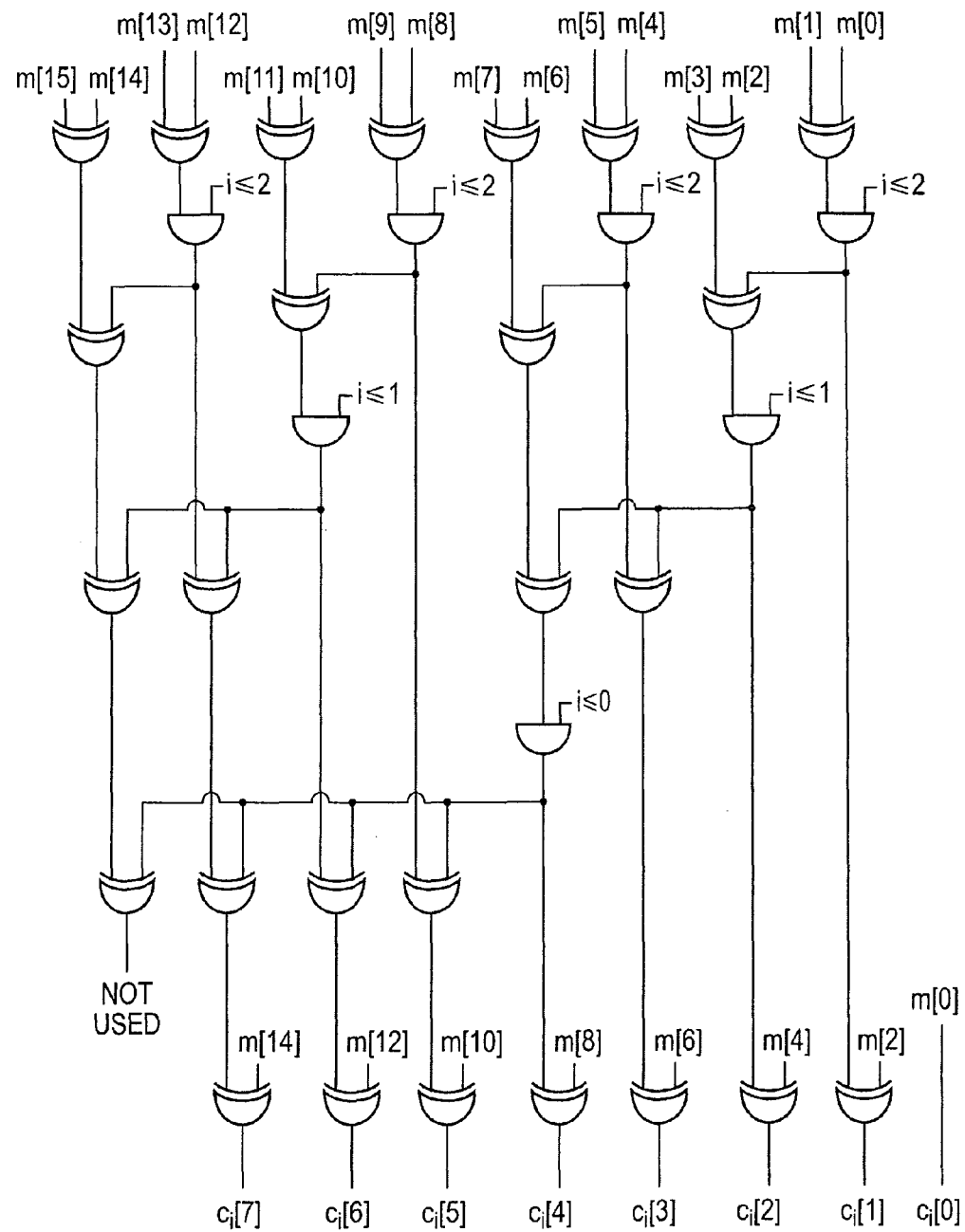
FIG. 6 schematically illustrates control generating circuitry for the example of a 16-bit mask.

FIG. 6 schematically illustrates an alternative implementation of the control circuitry of the control generator 116 in the case where n=3 i.e. for a 16 data-element input vector and mask. As for the circuitry of FIG. 5A, the circuitry comprises an array of XOR gates and AND gates. The output control values depend upon both the mask bits and the control-values (i.e. the values of i). The control generator circuitry 116 of FIG. 1 implements the following algorithm to calculate the output mask vector to be used for a subsequent stage of the calculation.

Control Generation

| INPUT | $2^{n+1}$ bit mask (m [$2^{n+1}$−1] ... m(0)) |
|---|---|
| OUTPUT | (n+1) control masks of $2^n$ bits each ($C_i$ [$2^n$−1] ... Ci[0]) |

-continued

```
ALGORITHM   for    i = 0, 1, 2 .... n
            {
            C_i [2^n-1] .... C_i [0] is the control mask generated by the control stage circuit
            if (C_i [K] then swap m[2K+1] and m[2K] for each K = 2^n-1, ...0
            Reorder (m[2^{n+1}-1] .... m[0] ← (m[2^{n+1}-1] m[2^{n+1}-3] ... m[1]
                                              m[2^{n+1}-2] m[2^{n+1}-4] ... m[0])
            }
```

Note: This can be implemented serially by recycling m, or by chaining the central step circuit n times.

```
                                    7 6 5 4 3 2 1 0
e.g.   n=2   i=0, 1, 2        m=[1 1 0 0 1 1 1 0] given
             3 2 1 0
given C_0 [ ] = [0 1 0 0] for i=0
then only C_0 [2] ≠ 0
∴ swap m[5] and m[4] → no change
re-order [m_7 m_6 m_5 m_4 m_3 m_2 m_1 m_0]
      → [m_7 m_5 m_3 m_1 m_6 m_4 m_2 m_0]
        [1 0 1 1 1 0 1 0] = value of m output for stage i=0
```

Note that the circuit of FIG. 6 can be extended in a straight forward manner to any mask size of a power of two.

FIG. 7 provides a program-code listing in the C programming language for a control generating instruction VDTLC according to an embodiment of the present invention. The control generating instruction VDTLC takes as input the 32-bit boolean values VBOOL16_T X0 and VBOOL16_T X1 as a 64-bit bit-mask and generates output comprising the control bits for configuring the butterfly permutation network 110 of FIG. 1. This program code implements the above mentioned control generating algorithm which involves swapping certain mask bits and reordering the mask to generate an input mask for the next stage of the calculation.

FIG. 8 is a provide program code listing specifically associated with the de-interleave rearrangement instruction.

FIG. 9 is a program code listing associated with the interleave rearrangement instruction.

In order to implement each of the rearrangement operations shown in FIG. 2A and FIG. 2B, a single atomic program instruction could be used. Alternatively, a combination of two or more program instructions could be used to generate the required output vector based on the given input vector. In particular in the described embodiment a separate control generating instruction is used to generate the control signals and a subsequent rearrangement instruction is used to perform either the interleave or the de-interleave rearrangement. It will be appreciated that the control generation and the interleave or de-interleave operation could be combined in a single program instruction in alternative embodiments.

The butterfly network schematically illustrated in FIG. 3 is only one example arrangement. The control signal generation described above generates control signals for use in constant-geometry butterflies. In constant-geometry butterfly permutation networks, the same pair of elements is always swapped, but the elements themselves are moved to generate different outputs. In alternative embodiments, a Fast Fourier Transform (FFT) style butterfly permutation work is used, where the data elements stay fixed, but the butterfly connections themselves change in order to perform the rearrangement.

Figure 10A:
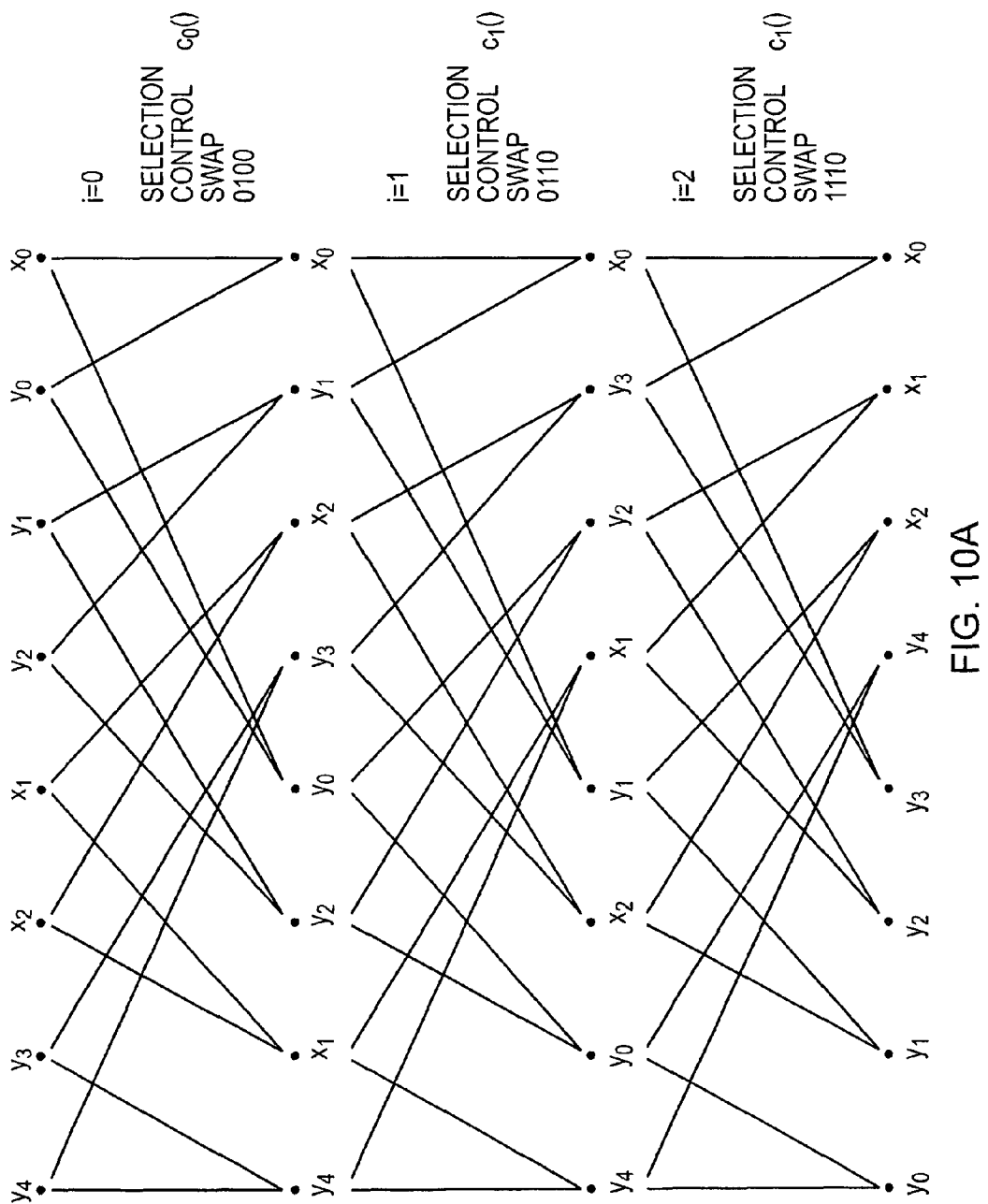
FIG. 10A schematically illustrates a constant-geometry butterfly circuit for a given de-interleave operation.
Figure 10B:
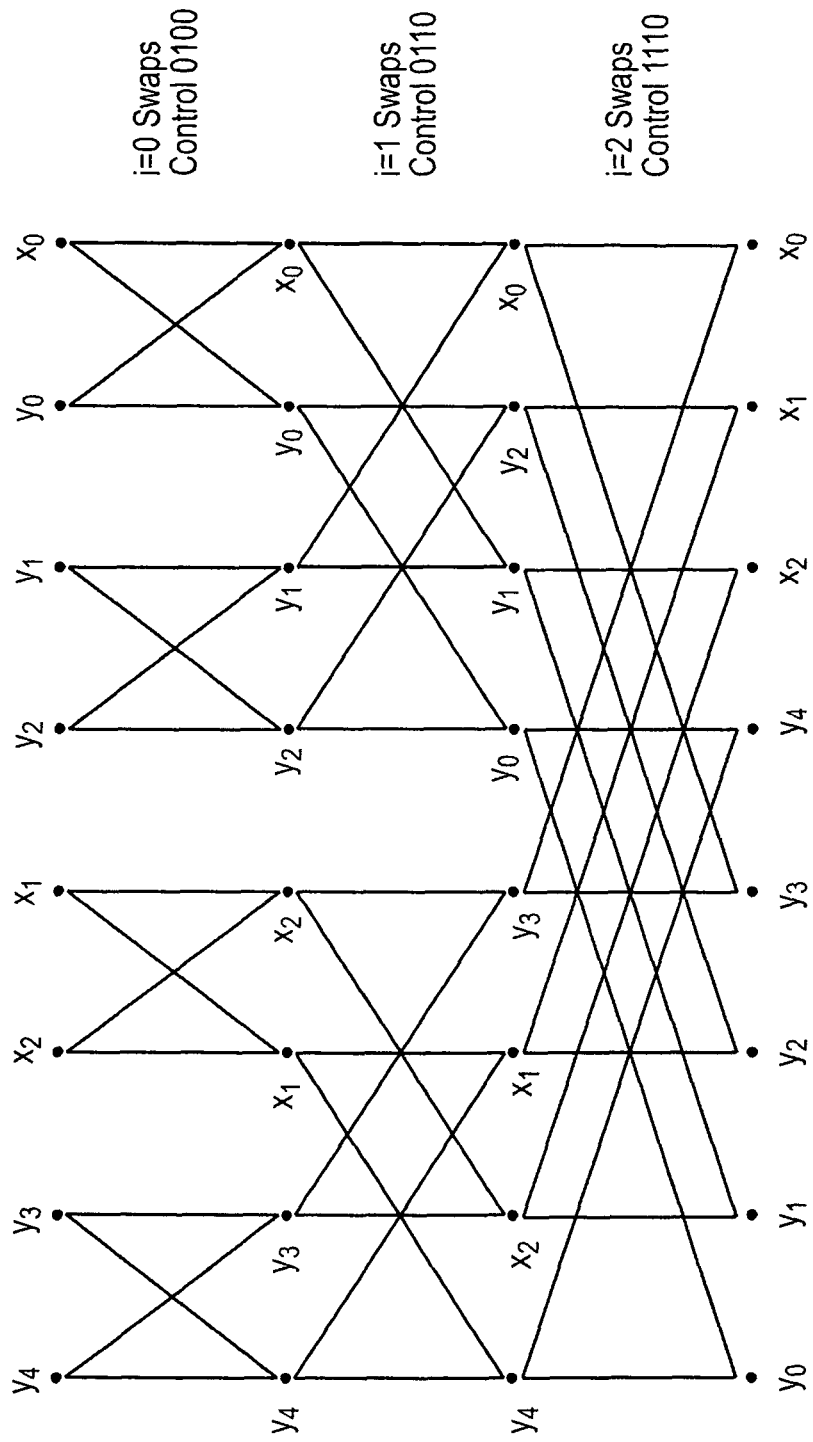
FIG. 10B schematically illustrates an in-place butterfly circuit for a given de-interleave operation.

FIG. 10A schematically illustrates a constant geometry butterfly circuit for a given de-interleave operation whilst FIG. 10B schematically illustrates an in place butterfly circuit for the same de-interleave operation. It can be seen that the control signals for each stage are the same in FIG. 10A and FIG. 10B but the swaps that are performed at each stage differ in the two diagrams. The circuits of FIG. 10A and FIG. 10B are the same i.e. they have the same connections but with a different physical two-dimensional layout. However, with the arrangement of FIG. 10A, there is an option to use only the first layer of gates and to reuse them three times in three cycles. In general, the control signals will be in a different order for the two circuits, but this is not the case for the particular set of control values of the example shown.

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described control-generating instructions may be executed as native instructions to the full or partial virtual machine, with the virtual machine together with its underlying hardware platform operating in combination to provide the processing circuitry and control circuitry described above.

Figure 11:
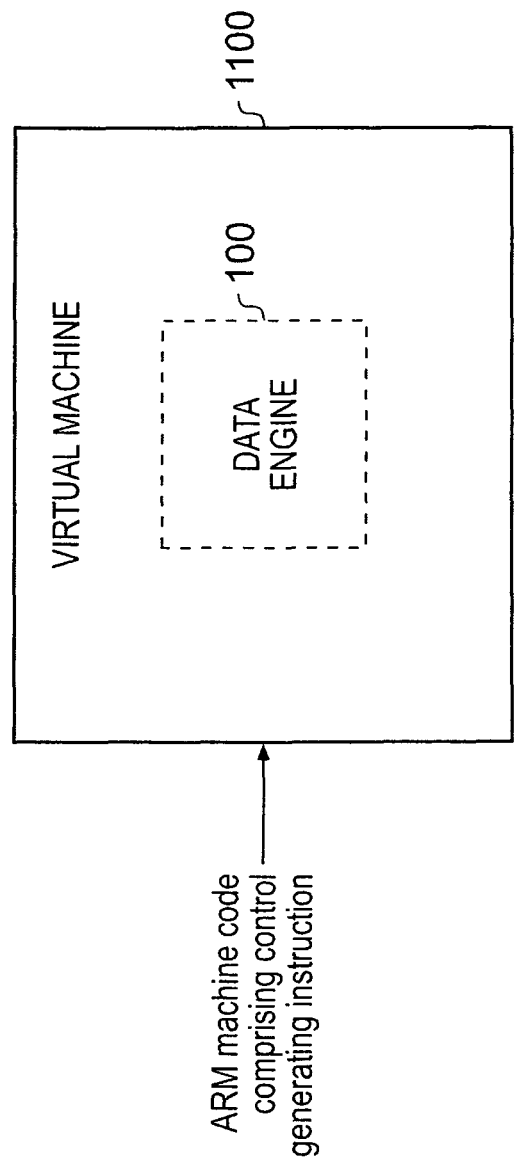
FIG. 11 schematically illustrates a virtual machine implementation of the data engine 100 of FIG. 1.

FIG. 11 schematically illustrates a virtual machine implementation of the data engine 100 of FIG. 1. The arrangement comprises a virtual machine 1100 arranged to emulate operation of the data engine 100. The virtual machine 1100 (e.g. emulating an ARM processor or data engine) is arranged to receive machine code (e.g. ARM machine code) including control-generating instructions in accordance with the present technique for which it emulates execution. If a general purpose processor on which the virtual machine is to be run is of sufficiently high performance, then realistic overall processing throughput may be achieved and the advantages of being able to execute an existing code base including control-generating instructions in accordance with the present technique may justify the use of a general purpose processor in this way.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:

processing circuitry for performing data processing operations comprising permutation circuitry for performing permutation operations;

a register bank having a plurality of registers for storing data;

control circuitry, responsive to program instructions, configured to control said processing circuitry to perform said data processing operations;

wherein said control circuitry is configured to be responsive to a control-generating instruction to generate, in dependence upon a bit-mask, control signal's to configure said permutation circuitry for performing a permutation operation on an input operand comprising data stored in one or more registers of said register bank;

wherein said bit-mask identifies within said input operand a first group of data elements having a first ordering and a second group of data elements having a second ordering, said permutation operation preserves one but changes the other of said first ordering and said second ordering, and both of said first and second groups of data elements comprise data stored in said register bank.

2. Apparatus as claimed in claim 1, wherein said changed ordering of one of said first ordering and second ordering comprises a reversed ordering.

3. Apparatus as claimed in claim 1, wherein said permutation operation is one of an interleave operation and a de-interleave operation.

4. Apparatus as claimed in claim 1, wherein said permutation operation is performed by a permutation instruction following configuration of said permutation circuitry by said control-generating instruction.

5. Apparatus as claimed in claim 1, wherein said control circuitry is responsive to said control-generating instruction both to configure said permutation circuitry and to perform said permutation operation.

6. Apparatus as claimed in claim 1, wherein said first group and said second group of data elements comprise multi-bit data elements.

7. Apparatus as claimed in claim 1, wherein said input operand comprises a packed vector.

8. Apparatus as claimed in claim 1, wherein said permutation operation is performed on an input vector of data comprising said first and second groups of data elements and generates an output vector of data comprising one of said first and second groups of data elements having preserved ordering and the other of said first and second groups of data elements having changed ordering.

9. Apparatus as claimed in claim 8, wherein said input vector comprises a plurality of vector registers and said output vector comprises a respective plurality of vector registers.

10. Apparatus as claimed in claim 1, comprising at least one mask register for storing said bit-mask.

11. Apparatus according to claim 10, wherein said at least one mask register uses a zero bit to indicate one of and a one bit to indicate the other of said first group of data elements and said second group of data elements respectively.

12. Apparatus according to claim 10, wherein said at least one mask register is a Boolean register.

13. Apparatus as claimed in claim 1, wherein said permutation circuitry comprises a butterfly network arranged to rearrange a plurality of data elements in dependence upon butterfly connections between pairs of said data elements.

14. Apparatus according to claim 13, wherein said butterfly network is a constant geometry network in which said butterfly connections remain fixed whilst said plurality of data elements are permitted to move.

15. Apparatus according to claim 13, wherein said butterfly connections remain fixed whilst said plurality of data elements are permitted to move.

16. Apparatus as claimed in claim 1, wherein said first group of data elements and said second group of data elements each have different numbers of constituent data elements.

17. Apparatus as claimed in claim 1, wherein said two ordered data sets correspond respectively to two different communication channels.

18. Apparatus as claimed in claim 1, wherein said data processing apparatus is a digital signal processor.

19. Apparatus as claimed in claim 1, wherein said data processing apparatus is a co-processor.

20. A method of performing permutation operations using a data processing apparatus having processing circuitry for performing data processing operations, a register bank having a plurality of registers for storing data and control circuitry responsive to program instructions to control said processing circuitry to perform said data processing operations, said processing circuitry comprising permutation circuitry for performing permutation operations, said method comprising the step of:

(i) in response to a control-generating instruction, generating in dependence upon a bit-mask, control signals to configure said permutation circuitry for performing a permutation operation on an input operand comprising data stored in one or more registers of said register bank;

wherein said bit-mask identifies within said input operand a first group of data elements having a first ordering and a second group of data elements having a second ordering, said permutation operation preserves one but changes the other of said first ordering and said second ordering, and both of said first and second groups of data elements comprise data stored in said register bank.

21. A computer program product including a non-transitory computer readable storage medium including a computer program for controlling a computer to perform a method as claimed in claim 20, said computer program comprising at least one control-generating instruction.

22. A non-transitory computer readable storage medium storing a virtual machine for providing an emulation of an apparatus for processing data, said apparatus comprising:

processing circuitry for performing data processing operations comprising permutation circuitry for performing permutation operations;

a register bank having a plurality of registers for storing data;

control circuitry responsive to program instructions to control said processing circuitry to perform said data processing operations;

wherein said control circuitry is arranged to be responsive to a control-generating instruction to generate in dependence upon a bit-mask, control signals to configure said permutation circuitry for performing a permutation operation on an input operand comprising data stored in one or more registers of said register bank;

wherein said bit-mask identifies within said input operand a first group of data elements having a first ordering and a second group of data elements having a second ordering, said permutation operation preserves one but changes the other of said first ordering and said second ordering, and both of said first and second groups of data elements comprise data stored in said register bank.

* * * * *